US010239575B2

(12) United States Patent
Oishi et al.

(10) Patent No.: US 10,239,575 B2
(45) Date of Patent: Mar. 26, 2019

(54) INVERTED TWO-WHEELED VEHICLE

(71) Applicant: TOYOTA JIDOSHA KABUSHIKI KAISHA, Toyota-shi, Aichi-ken (JP)

(72) Inventors: Kouta Oishi, Toyota (JP); Satoshi Toyoshima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 14/625,802

(22) Filed: Feb. 19, 2015

(65) Prior Publication Data
US 2015/0246703 A1 Sep. 3, 2015

(30) Foreign Application Priority Data
Feb. 28, 2014 (JP) .................................. 2014-038356

(51) Int. Cl.
*B62K 3/00* (2006.01)
*B62K 11/00* (2006.01)

(52) U.S. Cl.
CPC .................................. *B62K 11/007* (2016.11)

(58) Field of Classification Search
CPC .............................. B62K 3/007; B62K 21/12
USPC .......................... 180/7.1; 702/22, 37, 70, 124
See application file for complete search history.

(56) References Cited

U.S. PATENT DOCUMENTS

| | | | |
|---|---|---|---|
| 2006/0202439 A1* | 9/2006 | Kahlert et al. | 280/47.24 |
| 2006/0260857 A1* | 11/2006 | Kakinuma et al. | 180/218 |
| 2007/0084662 A1* | 4/2007 | Oikawa | 180/272 |
| 2007/0251735 A1* | 11/2007 | Kakinuma et al. | 180/6.5 |
| 2008/0147281 A1* | 6/2008 | Ishii | B62D 51/005 701/49 |
| 2009/0032323 A1* | 2/2009 | Kakinuma et al. | 180/218 |
| 2009/0288900 A1* | 11/2009 | Takenaka et al. | 180/218 |
| 2009/0315293 A1* | 12/2009 | Kosaka | 280/208 |
| 2010/0025139 A1* | 2/2010 | Kosaka et al. | 180/218 |
| 2010/0030441 A1* | 2/2010 | Kosaka | G05D 1/0891 701/70 |
| 2011/0282532 A1* | 11/2011 | Kosaka et al. | 701/22 |
| 2012/0166048 A1 | 6/2012 | Inoue et al. | |

FOREIGN PATENT DOCUMENTS

| | | | |
|---|---|---|---|
| JP | 2006-247035 A | | 9/2006 |
| JP | 2006-353080 A | | 12/2006 |
| JP | 2012-126224 A | | 7/2012 |
| JP | 2012-126258 A | | 7/2012 |
| JP | 2012126258 A | * | 7/2012 |

* cited by examiner

*Primary Examiner* — Jacob D Knutson
(74) *Attorney, Agent, or Firm* — Oliff PLC

(57) ABSTRACT

An inverted two-wheeled vehicle includes: an inverted two-wheeled vehicle body; a pair of step plates, a rider putting both feet on the pair of step plates; a parallel link mechanism that links the pair of step plates so that the pair of step plates are inclined to the right or the left in unison; a handle that is supported by the inverted two-wheeled vehicle body; and a controller that controls a turning movement of the inverted two-wheeled vehicle according to an inclination of the pair of step plates in the horizontal direction. The handle is supported by the inverted two-wheeled vehicle body so that the handle does not work with the pair of step plates when the step plates are inclined to the right or the left.

5 Claims, 4 Drawing Sheets

INVERTED TWO-WHEELED VEHICLE

INCORPORATION BY REFERENCE

This application is based upon and claims the benefit of priority from Japanese patent application No. 2014-038356, filed on Feb 28, 2014, the disclosure of which is incorporated herein in its entirety by reference.

BACKGROUND OF THE INVENTION

1. Field of the Invention The present invention relates to an inverted two-wheeled vehicle.

2. Description of Related Art

As a technique of this type, Japanese Unexamined Patent Application Publication No. 2012-126258 (Patent literature 1) discloses an inverted two-wheeled vehicle that performs a desired movement while keeping the inverted state. The inverted two-wheeled vehicle includes a pair of step plates and a parallel link mechanism linked to an operation handle. A user puts the feet on each of a pair of step plates, and rides the inverted two-wheeled vehicle with his/her hands holding the operation handle. The user then shifts the weight on the pair of step plates in the horizontal direction to incline the pair of step plates or inclines the operation handle in the horizontal direction, whereby the parallel link mechanism is inclined in the horizontal direction. A control apparatus of the inverted two-wheeled vehicle controls a turning movement of the inverted two-wheeled vehicle according to the inclination of the parallel link mechanism.

SUMMARY OF THE INVENTION

Incidentally, there has been a demand for the use of inverted two-wheeled vehicles in the field of rehabilitation as one means to restore the sense of balance.

An object of the present invention is to provide an inverted two-wheeled vehicle which is effective in restoring the sense of balance.

According to one aspect of the present invention, an inverted two-wheeled vehicle that performs a desired movement according to an input by a rider while keeping an inverted state is provided. The inverted two-wheeled vehicle includes: an inverted two-wheeled vehicle body; a pair of riding parts that are supported by the inverted two-wheeled vehicle body so that the pair of riding parts can be freely inclined in the horizontal direction, the rider putting both feet on the pair of riding parts; a link mechanism that links the pair of riding parts so that the pair of riding parts are inclined to the right or the left in unison; a grip part that is supported by the inverted two-wheeled vehicle body and is held by the rider; and a controller that controls a turning movement of the inverted two-wheeled vehicle according to an inclination of the riding parts in the horizontal direction. The grip part is supported by the inverted two-wheeled vehicle body so that the grip part does not work with the pair of riding parts when the pair of riding parts are inclined to the right or the left. According to the above configuration, the grip part cannot be used as input means when the inverted two-wheeled vehicle is turned. It is therefore required in the above configuration that the rider actively shifts the weight in the horizontal direction on the riding parts. Compared to the case in which the grip part can be used as the input means when the inverted two-wheeled vehicle is turned, the above configuration is more effective in restoring the sense of balance in the horizontal direction.

The grip part is supported by the inverted two-wheeled vehicle body in such a way that a movement of the grip part in the horizontal direction with respect to the inverted two-wheeled vehicle body is prohibited.

The grip part is supported by the inverted two-wheeled vehicle body via an elastic member. According to the above configuration, the rider who holds the grip part cannot fully rely on the support by the grip part. The above configuration is therefore effective in restoring the sense of balance in the horizontal direction.

The controller is configured to control a forward/rearward movement of the inverted two-wheeled vehicle according to a weight shift by the rider in a front-back direction. According to the above configuration, the rider is required to have a higher level of sense of balance in the front-back direction when moving the inverted two-wheeled vehicle in the forward or rearward direction, which is more effective in restoring the sense of balance in the front-back direction.

The present invention achieves an inverted two-wheeled vehicle which is effective in restoring the sense of balance.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS (First Embodiment)

Hereinafter, with reference to FIGS. 1 to 3, a first embodiment will be described.

Figure 1:
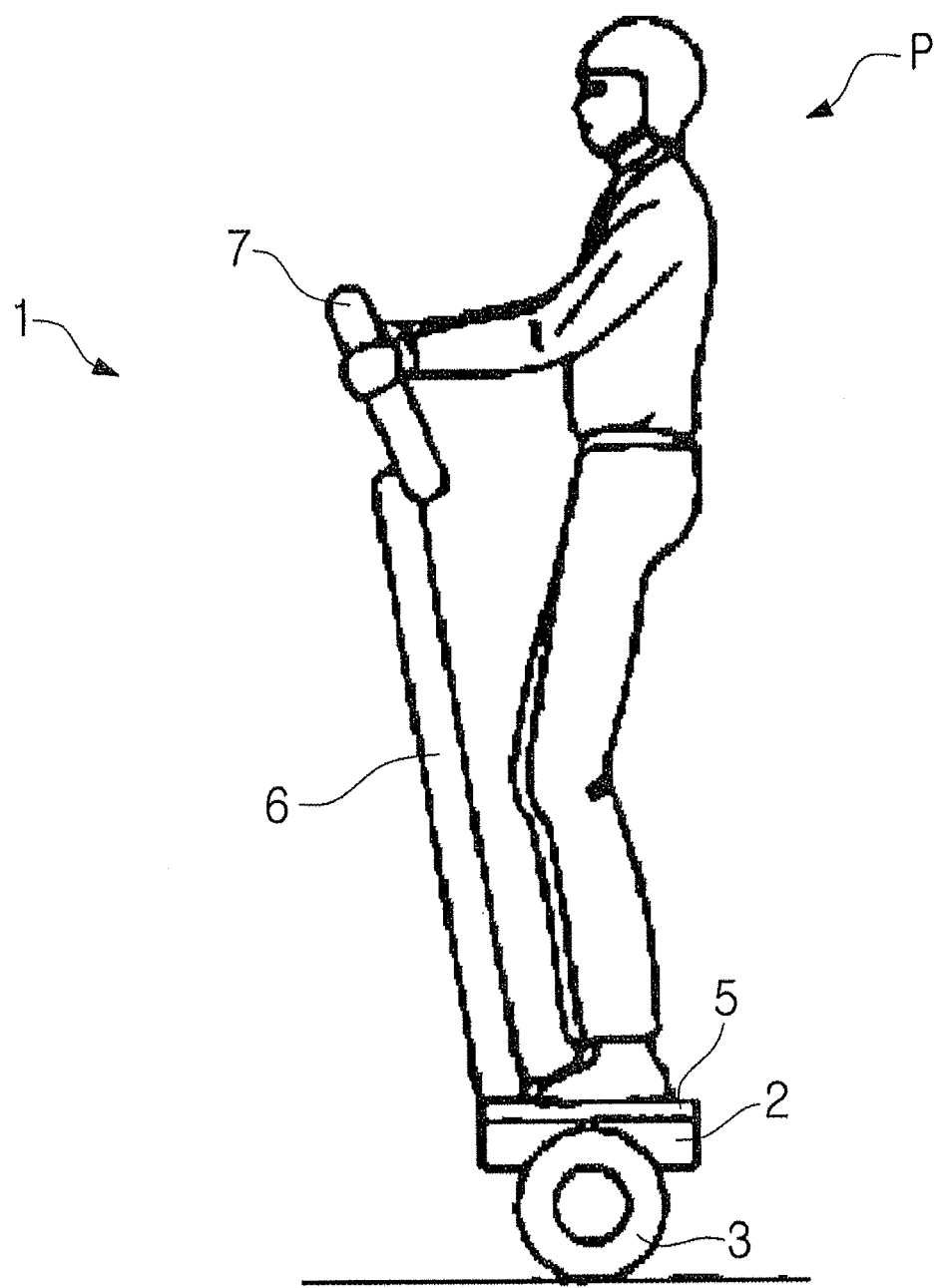
FIG. 1 is a side view of an inverted two-wheeled vehicle.

An inverted two-wheeled vehicle 1 shown in FIG. 1 is a moving body that performs a desired movement according to an input by a rider P while maintaining the inverted state. The desired movement includes, for example, a forward/rearward movement including a forward movement and a rearward movement, and a turning movement including a right turning movement and a left turning movement.

Figure 2:
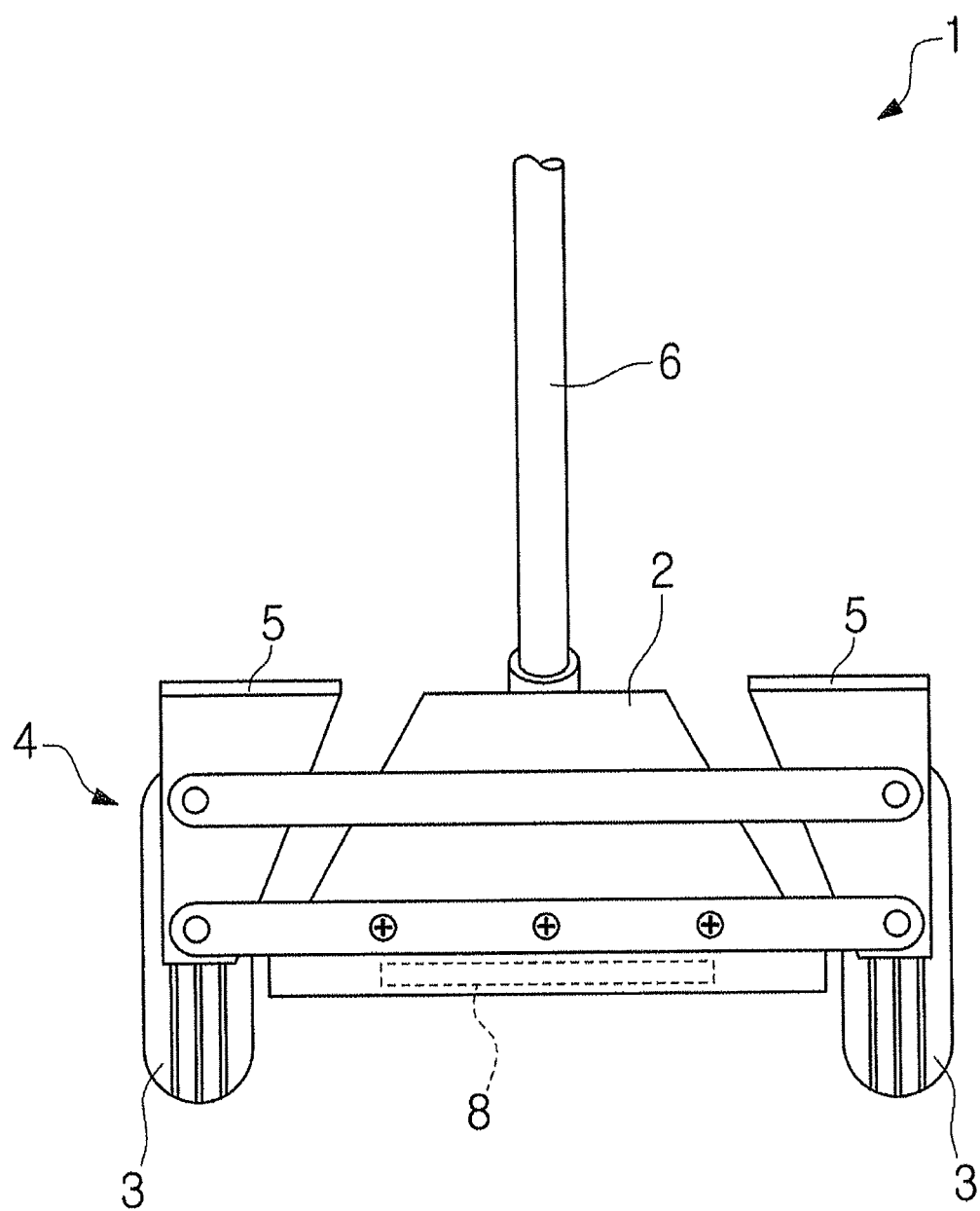
FIG. 2 is a front view of the inverted two-wheeled vehicle when the inverted two-wheeled vehicle moves forward.
Figure 3:
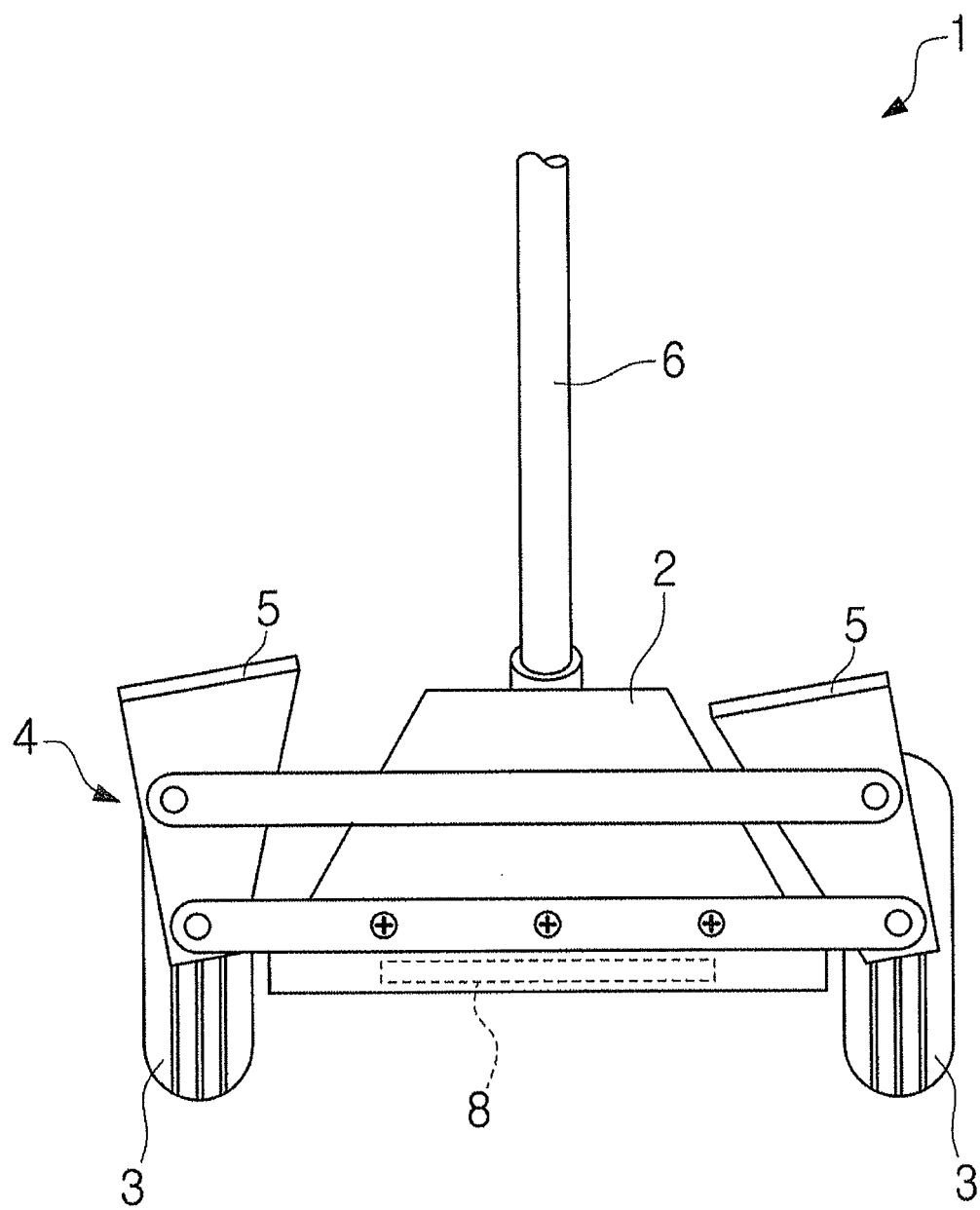
FIG. 3 is a front view of the inverted two-wheeled vehicle when the inverted two-wheeled vehicle is turned.

As shown in FIGS. 1 and 2, the inverted two-wheeled vehicle 1 includes an inverted two-wheeled vehicle body 2. A pair of wheels 3 are rotatably connected to the inverted two-wheeled vehicle body 2. A parallel link mechanism 4 is provided in the inverted two-wheeled vehicle body 2, and a pair of step plates 5 (riding parts) are attached to the parallel link mechanism 4. The pair of step plates 5 are parts on which the rider P places both feet. The pair of step plates 5 are supported by the inverted two-wheeled vehicle body 2 via the parallel link mechanism 4 so that the step plates 5 can be freely inclined in the horizontal direction in unison. A handle strut 6 is fixed to the inverted two-wheeled vehicle body 2, and a handle 7 (grip part) is attached to the tip of the handle strut 6. The handle 7 is therefore supported by the inverted two-wheeled vehicle body 2 so that the handle 7 moves neither in the horizontal direction nor in the front-back direction with respect to the inverted two-wheeled vehicle body 2. In other words, the handle 7 is supported by the inverted two-wheeled vehicle body 2 in such a way that the movement of the handle 7 in the horizontal direction with respect to the inverted two-wheeled vehicle body 2 is prohibited. The handle 7 therefore does not work with the pair of step plates 5 when the step plates 5 are inclined to the right or the left.

The inverted two-wheeled vehicle body 2 includes a controller 8 that controls the turning movement of the inverted two-wheeled vehicle 1 according to the inclination of the pair of step plates 5 in the horizontal direction and the forward/rearward movement of the inverted two-wheeled vehicle 1 according to the weight shift by the rider P in the front-back direction. Regarding the turning movement, the controller 8 detects a link angle of the parallel link mechanism 4 and controls the turning movement of the inverted two-wheeled vehicle 1 based on the detection results. FIG. 3 shows a state in which the pair of step plates 5 are inclined to the left. In this case, the controller 8 controls the movement of the inverted two-wheeled vehicle 1 so that the inverted two-wheeled vehicle 1 turns to the left. Further, regarding the forward/rearward movement, the controller 8 detects the distribution of load of the pair of step plates 5, and controls the forward/rearward movement of the inverted two-wheeled vehicle 1 based on the detection results.

According to the above configuration, the handle 7 cannot be used as input means when the inverted two-wheeled vehicle 1 is turned. It is therefore required in the above configuration that the rider actively shifts the weight in the horizontal direction on the pair of step plates 5. Compared to the case of Patent literature 1 in which the handle 7 can be used as the input means when the inverted two-wheeled vehicle 1 is turned, the above configuration is more effective in restoring the sense of balance in the horizontal direction.

Further, since the handle 7 is supported by the inverted two-wheeled vehicle body 2 so that the handle 7 is not movable in the horizontal direction with respect to the inverted two-wheeled vehicle body 2, the rider P is able to further concentrate on the weight shift in the horizontal direction on the pair of step plates 5.

In the first embodiment, the handle 7 may be formed so as to be movable in the horizontal direction with respect to the inverted two-wheeled vehicle body 2. In this case, the handle 7 need to be formed so as to be movable in the horizontal direction with respect to the inverted two-wheeled vehicle body 2 independently from the inclination of the parallel link mechanism 4 in the horizontal direction. In other words, in this case, the handle 7 need to be formed so as to be movable in the horizontal direction with respect to the inverted two-wheeled vehicle body 2 independently from the inclination of the pair of step plates 5 in the horizontal direction. Said another way, the handle 7 is supported by the inverted two-wheeled vehicle body 2 so that the handle 7 does not work with the pair of step plates 5 when the step plates 5 are inclined in the horizontal direction.

(Second Embodiment)

Hereinafter, with reference to FIG. 4, a second embodiment will be described. In the second embodiment, the parts different from those in the first embodiment will be mainly described, and the components same as those in the first embodiment are denoted by the same reference symbols and the descriptions thereof will be omitted as appropriate.

Figure 4:
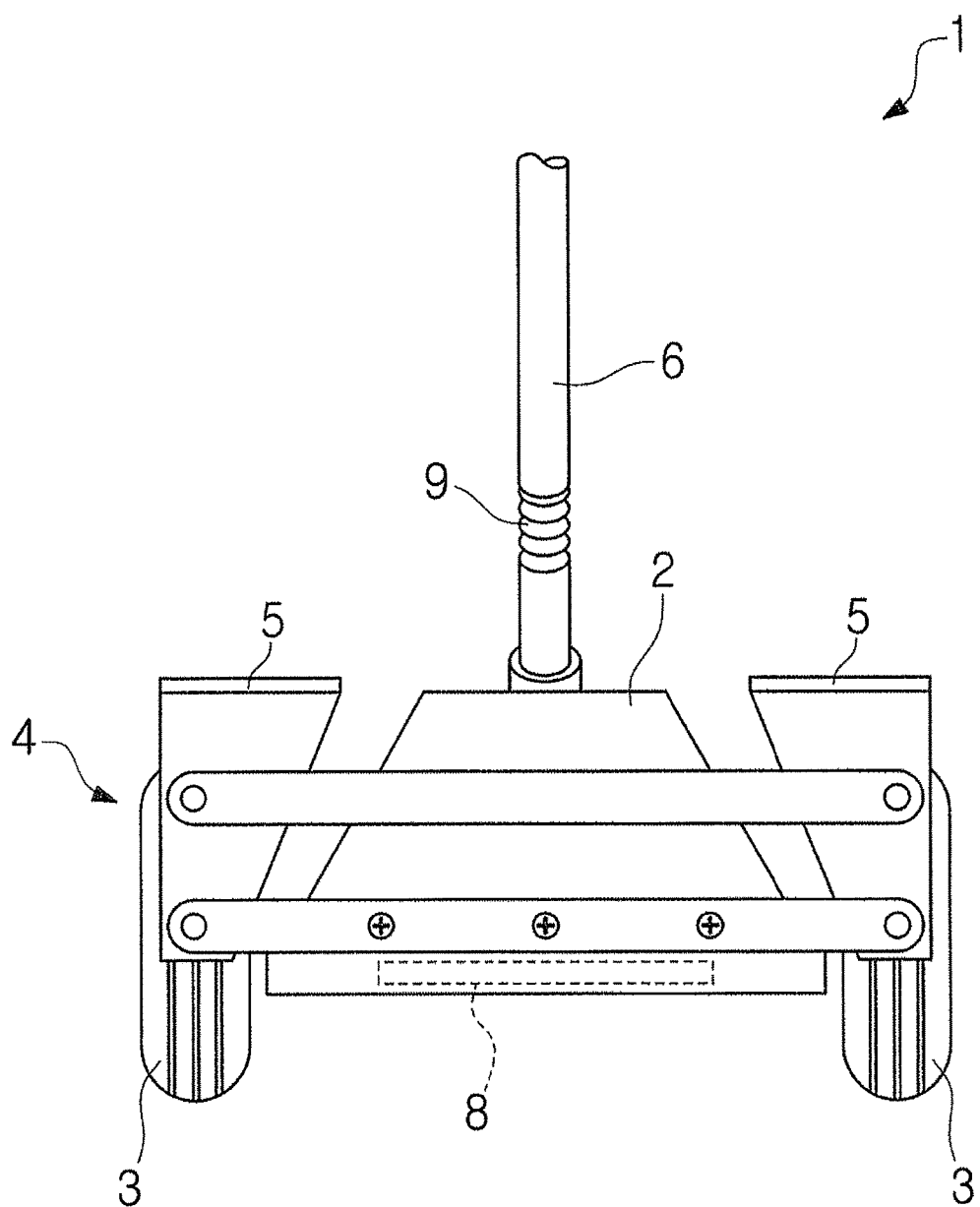
FIG. 4 is a front view of the inverted two-wheeled vehicle when the inverted two-wheeled vehicle moves forward.

As shown in FIG. 4, in this embodiment, a part of the handle strut 6 includes a spring 9 (elastic member). In other words, the handle 7 is supported by the inverted two-wheeled vehicle body 2 via the spring 9. The handle 7 is supported by the inverted two-wheeled vehicle body 2 so that the handle 7 does not work with the pair of step plates 5 when the step plates 5 are inclined in the horizontal direction. According to the above structure, the posture of the handle 7 with respect to the inverted two-wheeled vehicle body 2 becomes unstable, which means the rider P who holds the handle 7 cannot fully rely on the support by the handle 7. Accordingly, the rider P is required to have a higher level of sense of balance in the front-back direction when moving the inverted two-wheeled vehicle 1 in the forward or rearward direction, which is more effective in restoring the sense of balance in the front-back direction.

In the above second embodiment, other elastic members such as rubber may be used in place of the spring 9. Further, by differentiating springs 9 having different spring constants according to the degree of sense of balance of the rider P in the front-back direction, it is possible to restore the sense of balance in the front-back direction more effectively. Specifically, when the rider P having a good sense of balance in the front-back direction rides on the inverted two-wheeled vehicle 1, the spring 9 having a small spring constant may be selected to increase the level of the rehabilitation. Meanwhile, when the rider P having a poor sense of balance in the front-back direction rides on the inverted two-wheeled vehicle 1, the spring 9 having a large spring constant may be selected to lower the level of the rehabilitation.

The first and second embodiments of the inverted two-wheeled vehicle 1 have been described above. At the rehabilitation sites to restore the sense of balance, the inverted two-wheeled vehicle 1 can be used in different ways as follows. That is, for the beginners who have just started the rehabilitation to restore the sense of balance, the inverted two-wheeled vehicle 1 disclosed in Patent literature 1 is suitable, in which the rider can operate the turning movement of the inverted two-wheeled vehicle 1 with the handle 7. Meanwhile, for the people at the intermediate level who continues the rehabilitation to restore the sense of balance for a certain period of time, the inverted two-wheeled vehicle 1 according to the first embodiment is suitable, in which the rider cannot operate the turning movement of the inverted two-wheeled vehicle 1 with the handle 7. For the experienced people who have restored the sense of balance to some degree, the inverted two-wheeled vehicle 1 according to the second embodiment is suitable, in which the rider P who holds the handle 7 cannot fully rely on the support by the handle 7. It is possible to appropriately select the type of inverted two-wheeled vehicle 1 to be used depending on the degree of process of the rehabilitation of the rider P.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An inverted two-wheeled vehicle that is configured to perform a desired movement according to an input by a rider while keeping an inverted state, the inverted two-wheeled vehicle comprising:
   an inverted two-wheeled vehicle body;
   a pair of riding parts that are supported by the inverted two-wheeled vehicle body, the pair of riding parts configured to be inclined to the right and the left with respect to a ground, and to receive both feet of the rider;

a link mechanism that links the pair of riding parts so that the pair of riding parts are inclined to the right or the left in unison;

a grip part that is held by the rider, the grip part configured to move to the right and the left with respect to the ground independent of the pair of riding parts;

a handle strut that extends vertically between the inverted two-wheeled vehicle body and the grip part in a straight manner, a lower part of the handle strut being attached to the inverted two-wheeled vehicle body and the grip part being attached to an upper part of the handle strut, a part of the handle strut being an elastic member, the elastic member being disposed between the lower part of the handle strut and the upper part of the handle strut; and a controller that controls a turning movement of the inverted two-wheeled vehicle according to the inclination of the pair of riding parts to the right or the left with respect to the ground, wherein when the pair of riding parts are inclined to the right or the left with respect to the ground, the grip part is prevented from making a corresponding movement to the right or the left.

2. The inverted two-wheeled vehicle according to claim 1, wherein the controller is configured to control a forward or rearward movement of the inverted two-wheeled vehicle according to a weight shift by the rider in a front-back direction.

3. The inverted two-wheeled vehicle according to claim 1, wherein the elastic member is integrally formed with the handle strut and configured to connect the lower part of the handle strut and the upper part of the handle strut.

4. The inverted two-wheeled vehicle according to claim 1, wherein the elastic member is positioned above the pair of riding parts in a vertical direction.

5. The inverted two-wheeled vehicle according to claim 1, wherein the pair of riding parts include two distinct parts separated by a gap.

\* \* \* \* \*